United States Patent
Wilfong

Patent Number: 5,940,511
Date of Patent: *Aug. 17, 1999

[54] METHOD AND APPARATUS FOR SECURE PIN ENTRY

[75] Inventor: Gordon Thomas Wilfong, Gillette, N.J.

[73] Assignee: Lucent Technologies, Inc., Murray Hill, N.J.

[*] Notice: This patent is subject to a terminal disclaimer.

[21] Appl. No.: 08/866,463

[22] Filed: May 30, 1997

Related U.S. Application Data

[62] Division of application No. 08/356,017, Dec. 14, 1994, Pat. No. 5,754,653.

[51] Int. Cl.$^6$ ....................................................... H04K 1/00
[52] U.S. Cl. ................................... 380/25; 380/23; 380/24
[58] Field of Search .................................. 380/23, 24, 25

[56] References Cited

U.S. PATENT DOCUMENTS

| | | | |
|---|---|---|---|
| 5,060,263 | 10/1991 | Bosen et al. | 380/25 |
| 5,093,861 | 3/1992 | Gaham | 380/23 |
| 5,130,519 | 7/1992 | Bush et al. | 235/380 |
| 5,168,520 | 12/1992 | Weiss | 380/23 |
| 5,196,840 | 3/1993 | Leith et al. | 340/825.3 |
| 5,239,583 | 8/1993 | Parrillo | 380/23 |
| 5,655,020 | 8/1997 | Powers | 380/25 |

*Primary Examiner*—Gail O. Hayes
*Assistant Examiner*—Hrayr A. Sayadian

[57] ABSTRACT

A method and apparatus for secure entry and authentication of a multi-digit personal identification number (PIN) is described. An authenticator generates a random number, and provides that number, or a function thereof, to a user. The user is prompted to encode each digit of the PIN number, one digit at a time, by performing a mathematical operation on the digit using the number provided by the authenticator. The encoded PIN digit is provided to the authenticator which reverses the steps performed by the user to regenerate and verify the user's PIN. The user is prompted to encode subsequent digits of the PIN only after (1) a previous digit is encoded, (2) the encoded digit is provided to an input device for the authenticator, (3) and a new random number is generated and that random number, or a function thereof, is provided to the user for encoding a subsequent PIN digit.

6 Claims, 5 Drawing Sheets

METHOD AND APPARATUS FOR SECURE PIN ENTRY

This application is a division of application Ser. No. 08/356,017, filed on Dec. 14, 1994, now U.S. Pat. No. 5,754,653.

FIELD OF THE INVENTION

This invention relates to method and apparatus for authorization of a user in a secure computer system by user entry of a secret Personal Identification Number (PIN). More specifically, the invention relates to a method and apparatus for secure entry of a PIN in an environment in which the user may be subject to observation by adverse bystanders intending to obtain the number for fraudulent use.

BACKGROUND OF THE INVENTION

Many consumer transactions today are conducted between the consumer and a mechanized representative of the other party, without human involvement on behalf of the non-consumer party. Examples of such transactions include banking transactions performed through automated teller machines (ATM's) and telephone calls placed at public telephones using telephone credit cards. In both of these examples, the identity of the consumer is verified for security purposes through the use of a PIN. In the case of an ATM, the banking customer first inserts an access card, and must then correctly enter a multidigit code, which the ATM system associates with the individual access card.

To use a telephone credit card, a caller must enter a valid telephone credit card number when prompted, usually by an automated operator. The number often consists of a multi-digit code, such as the caller's home telephone number. The caller must then typically enter a four-digit PIN.

In both of the above-described scenarios, the PINs are entered by the consumer through the use of a numeric keypad with an unchanging, standardized configuration. Because the location of the keys on the keypad is a constant, an adverse observer can deduce a PIN by simply observing the identity and order of the keys pressed by the consumer. An adversary can also gain information about the PIN by posing as the user and making deductions based on the system's prompts or responses. The adversary can then use the fraudulently procured PIN in a later transaction, in which the identical keystrokes will again provide access to the system.

In the case where authorization of the consumer is based solely on the correct input of a code, such as a telephone credit card number plus a PIN, the successful adverse observer can make immediate fraudulent use of the newly obtained number simply by placing a call using the stolen number. In the case where authentication depends on the possession of an access card such as an ATM card, in addition to knowledge of a PIN, the successful adverse observer must in addition procure the consumer's card or manufacture a copy. While the second step requires additional sophistication or determination, such crimes occur with increasing regularity.

Several solutions have been proposed to the problem of adverse observation of PIN entry. A simple proposal is the use of mechanical sight barriers to block observation of the keypad during PIN input. Such barriers, however, are expensive and must necessarily compromise their effectiveness for the convenience of the user, who must himself see the keypad during PIN input, and must also access the keypad with his fingers.

Several systems have been proposed in which special equipment is used to deter adverse observers. U.S. Pat. No. 3,587,051 to Hovey discloses a lock with a series of randomly illuminated lights selected by the user on the basis of a known combination. U.S. Pat. No. 4,032,931 to Haker uses a four-by-three key matrix with eleven moveable keys and one vacant space, so that the keys that can be scrambled by the user before typing the PIN. U.S. Pat. Nos. 4,333,090 to Hirsch, 4,502,048 to Rehm and 4,962,530 to Cairns disclose systems in which the numeric designation of keys in fixed positions on the keypad can be changed from transaction to transaction. In U.S. Pat. No. 5,276,314 to Martino et al., an array of symbols is manipulated by buttons that rotate the symbols in columns or rows within the array.

Other systems use existing terminal equipment. In U.S. Pat. No. 5,239,583 to Parrillo, the PIN is changed after each transaction in a predetermined sequence known to the user. U.S. Pat. No. 5,311,594 to Penzias describes a system wherein the user is prompted to input pieces of information already known to the user, such as a street address.

SUMMARY OF THE INVENTION

In one embodiment of the present invention, a method and apparatus are provided for securely entering a PIN number in a public location. Preferably, the invention provides a system that (1) requires no physical modifications to existing equipment used by the caller, (2) places as little extra burden on the caller as possible, (3) reveals no information to an observer and (4) reveals no information to someone posing as a caller.

The present invention may also provide a system that prompts the user to perform mathematical or other operations involving the PIN together with a generated random number, and to input the result of the operation. The system prompts are made in such a way as not to be observable by bystanders. For example, in the case of a public telephone system, a caller is guided through the PIN entry sequence by prompts issued by an automated operator.

The user inputs his responses using a standard keypad or other input device. Because the operation is randomized, and the input is different for each transaction, little or no information about the PIN is revealed to an adverse observer.

In the preferred embodiment of the system, a separate prompting sequence is carried out for each digit of the PIN, using a single digit random number generated to correspond to each PIN digit. In this way, operations to be performed by the user involve only single digit numbers, and can be done in the user's head.

In a further embodiment, the system generates a single-digit random number corresponding to each digit of the user's PIN, and calculates the difference between the random number and the corresponding PIN digit. The system then prompts the user to recreate the random number by adding, or subtracting in the case of a negative difference, this difference and the PIN digit, and prompts the user to input the result. The system can then verify user knowledge of the PIN by comparing the user input to the random number.

Alternatively, for each digit of the PIN, the system generates a single-digit random number and prompts the user to input the sum, for example, by modulo 10 addition, of the PIN digit and the random number. The system then subtracts the random number from the input and compares the result to the PIN digit for authorization.

DETAILED DESCRIPTION OF THE INVENTION

While the secure PIN entry system of the invention may be widely used, it is best described and understood with reference to specific applications. It should be understood that such specific applications are by way of example, and should not be taken as limiting the scope of the invention.

Figure 1:
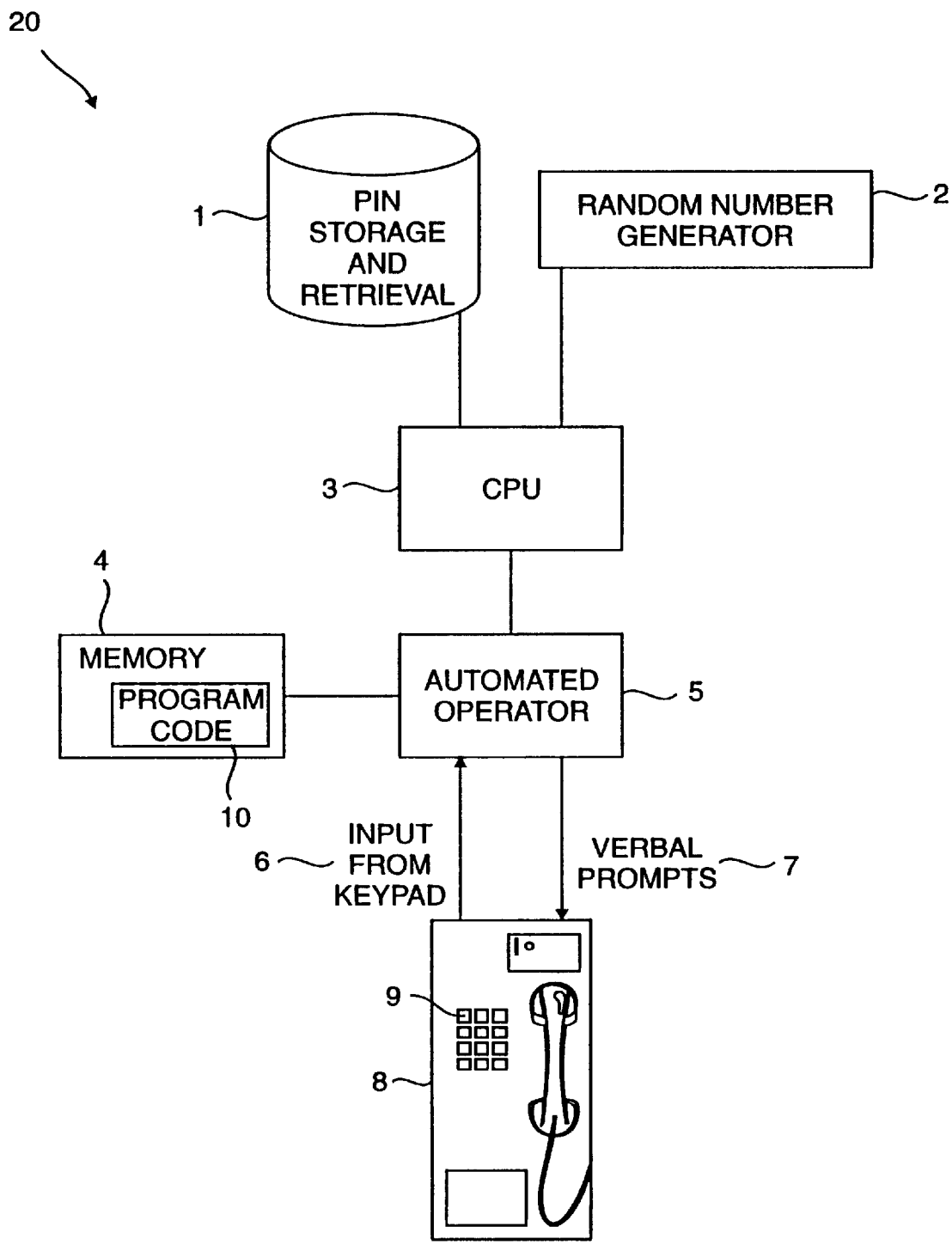
FIG. 1 shows an apparatus for secure entry of a PIN in a public location.

The system described herein may be implemented using one or more programmed digital computers of the type well known in the art and shown embodied in a telephone system 20 in FIG. 1. FIG. 1 shows a computer central processing unit 3 having a PIN storage/retrieval system 1 and a random number generator 2. While shown separately in FIG. 1, the PIN storage/retrieval system 1 and the random number generator 2 may be part of an integral memory of the central processing unit 3. It should also be noted that "pseudo-random" numbers, as this term is commonly used in the art to apply, for example, to time-based or list-based number generating systems, may be used in place of random numbers in the system of the invention.

The functions of the present invention may be performed by the central processing unit 3 executing computer program code 10 which is stored in the memory unit 4. The central processing unit 3 may suitably be any one of the types of processor which are well known in the art, such as, a mainframe computer, a minicomputer, a workstation, or a personal computer.

The central processing unit 3 preferably sends instructions to and receives information from an automated operator 5. The automated operator 5 is of a type known in the art, capable of issuing recorded voice instructions over telephone lines and receiving input over those lines from a keypad. In the embodiment of FIG. 1, the automated operator 5 issues verbal prompts 7 to a user of a public telephone 8. The automated operator 5 additionally receives input 6 from the user through a keypad 9 of the public telephone 8.

Figure 2:
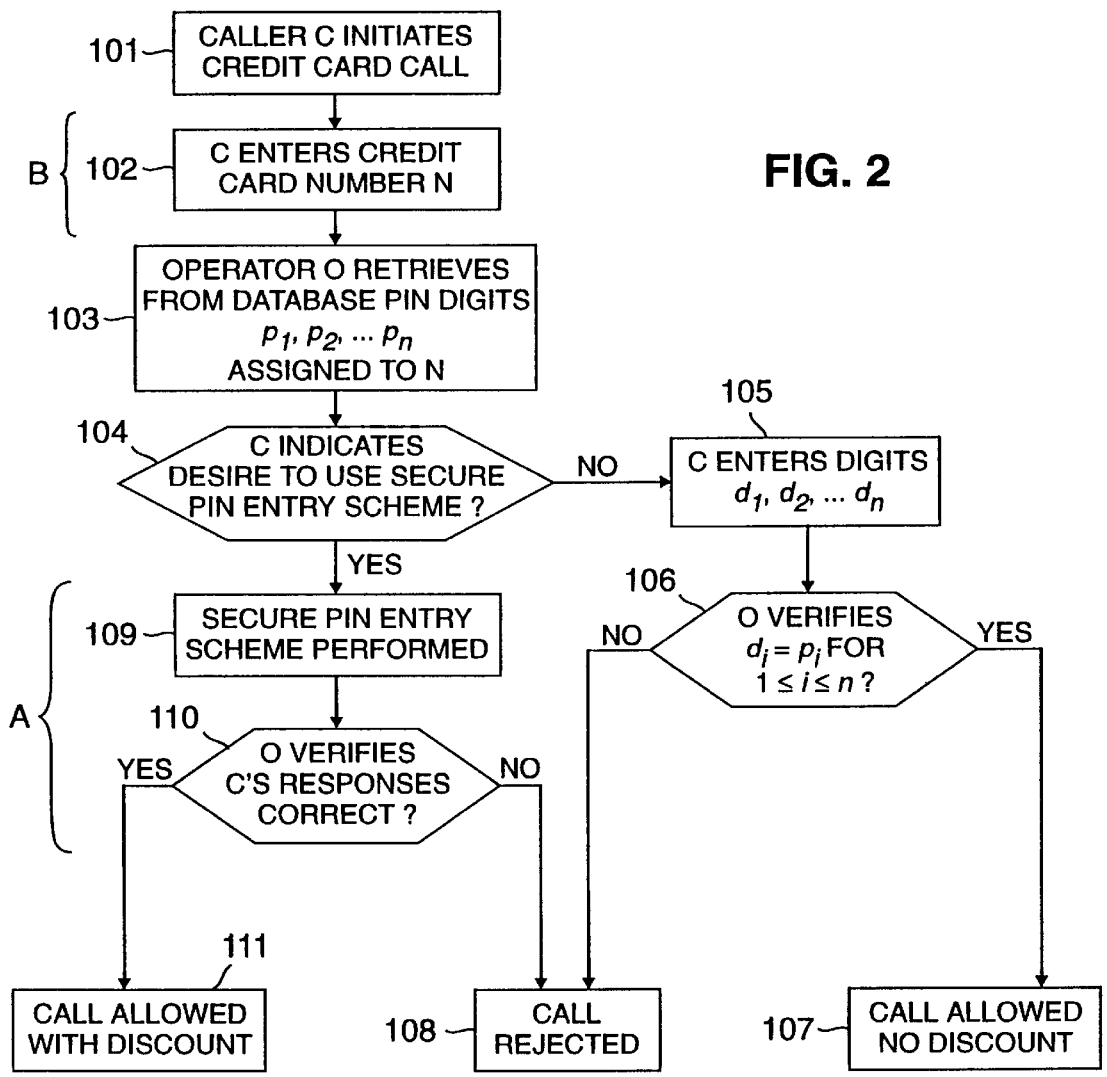
FIG. 2 is a block diagram of a system incorporating the basic blocks of the present invention.

A general block diagram of a secure PIN verification system, as embodied in a public telephone system, is shown in FIG. 2. A caller C initiates the sequence by placing a credit card call, as indicated in block 101. Typically, this will be done utilizing a keypad, such as the keypad 9 of FIG. 1. The system contains an automated operator O, such as the automated operator 5 of FIG. 1, that may prompt the caller by voice to enter his credit card number.

The caller identifies himself to the system in step 102 by entering a credit card number N. This number can be the home phone number of the caller, or can be a dedicated credit card account number. In this example, the credit card account number is keyed in directly by the caller, using the keypad system of the telephone, and without using the secure entry system of the invention. Alternatively, a secure system may be used, as is more completely described below with reference to FIG. 5.

The automated operator O then retrieves from a database the PIN digits $P_1, P_2, \ldots, P_n$, assigned to the credit card number N, as shown in step 103. The database contains one or more PINs associated with each account number for authorizing access to the account. The security of the system therefore depends on the security of the PINs.

In step 104, the caller is given a choice whether or not to use the secure PIN entry system. The task of entering a PIN using the system of the invention requires more effort on the part of the user than the direct key entry of a PIN. It may therefore be beneficial to allow a user in a secure location such as an office or hotel room to bypass the system and enter the PIN directly. Depending on system requirements, the automated operator may default to direct key entry, requiring an affirmative action by the caller in order to invoke the secure PIN entry system. Alternatively, the operator may default to the secure system. The automated operator may even make the use of secure PIN entry system mandatory in locations known to have a high incidence of PIN theft, such as public transportation terminals. one way of doing this is to store in memory a list of locations having a high incidence of PIN theft and to compare the location of each credit card call against this list. Additionally, the operator may remind the caller of discounts made available to users of the secure system in order to encourage its use.

If the caller chooses not to use the secure system, the caller enters digits $d_1, d_2, \ldots, d_n$ in the traditional manner using the telephone keypad, as shown in step 105. In step 106, the automated operator then verifies that each digit $d_i$ equals its corresponding $p_i$ in the PIN, and grants or denies access in blocks 107 and 108 to the credit card account based on this comparison. In a system making discounts available to secure PIN entry users, the unsecured entry in this case would not trigger a discount, as indicated in block 107.

If the caller chooses in step 104 to use the secure PIN entry system, then the automated operator prompts the caller through the secure PIN entry sequence, generally represented by block 109. The operator then verifies in step 110 that the caller's responses are correct, indicating that the caller has knowledge of the PIN. When the responses are incorrect, the caller is denied access in block 108.

When the responses are correct, the caller is granted access, as shown in block 111. In a system making discounts available to secure PIN entry users, the discount would be triggered subsequent to the grant of access.

A general implementation of the secure PIN entry arrangement of the invention for a telephone system is shown in blocks 109 and 110 of FIG. 2, and delineated by bracket "A". More detailed representations of specific embodiments of the secure PIN entry subsystem are shown in FIGS. 3 and 4.

Figure 3:
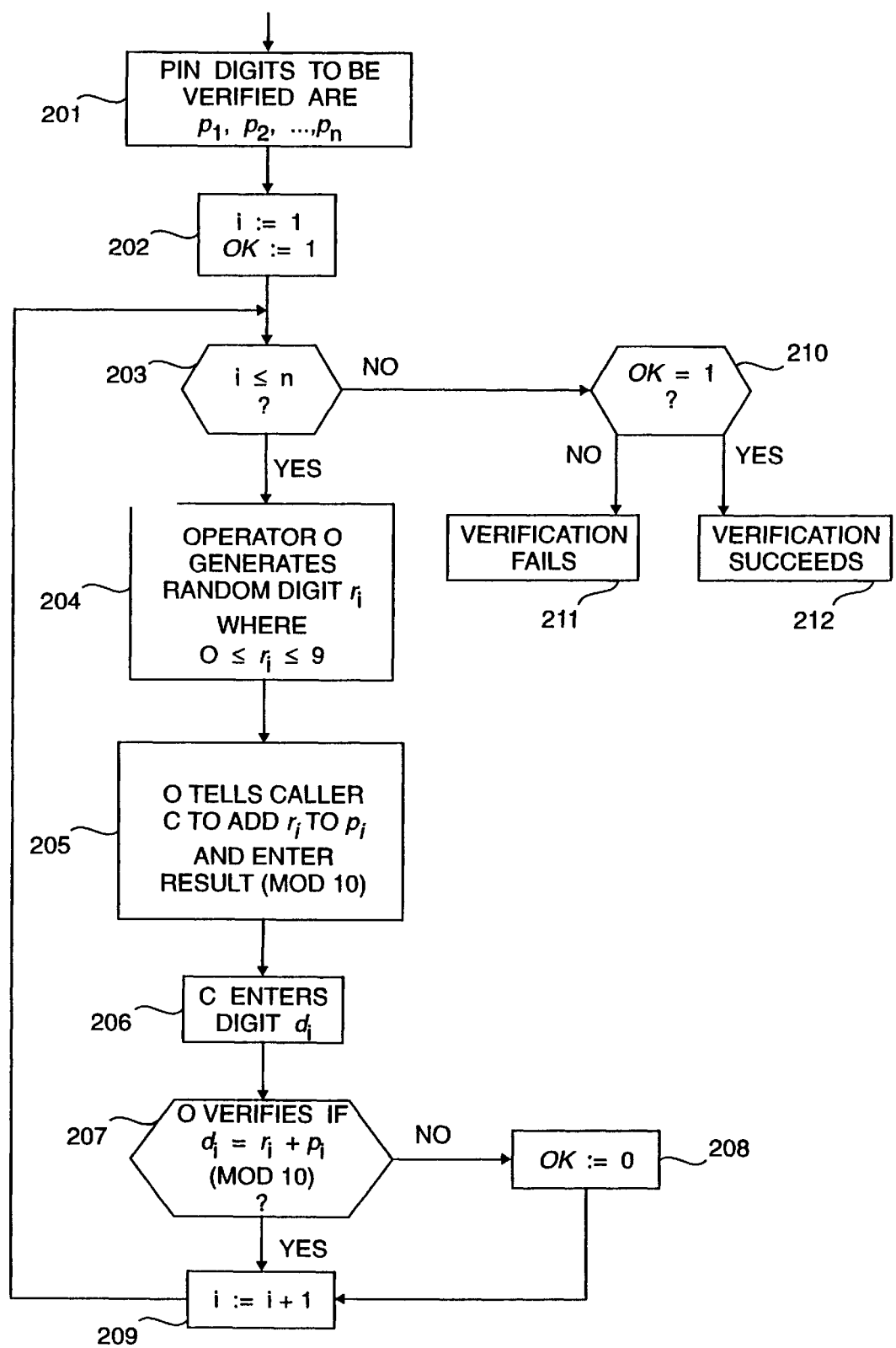
FIG. 3 is a block diagram of one secure PIN entry arrangement suitable for use in the system of FIG. 2.
Figure 4:
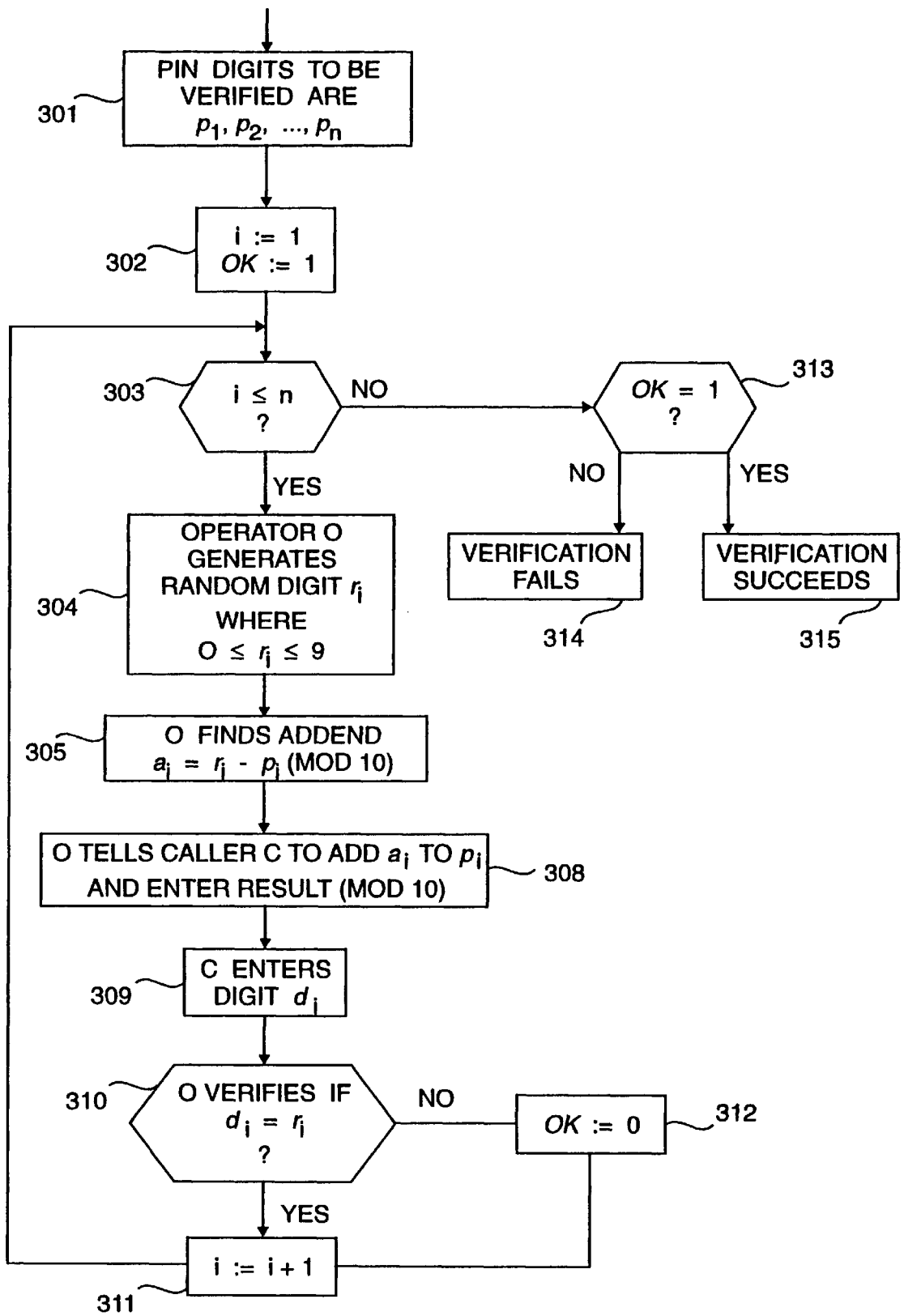
FIG. 4 is a block diagram of another secure PIN entry arrangement suitable for use in the system of FIG. 2.

The sequence of FIG. 3 is initiated in block 201 after the automated operator has retrieved the PIN digits $P_1, P_2, \ldots, P_n$ assigned to the caller's account number, as represented in block 103 in FIG. 2. The secure PIN verification sequence is initialized in step 202 of FIG. 3 by resetting an incremental counter i for indexing the individual PIN digits, and resetting a PIN validity indicator OK to 1. The system then executes the verification sequence for each PIN digit $p_i$ as directed by blocks 203 through 209.

The verification system first generates a random, single-digit integer $r_i$, as shown in block 204. The automated operator in block 205 then prompts the caller to add $r_i$ to the first digit of the PIN $P_1$ and to enter the result modulo 10. The caller follows the instruction in block 206 by entering digit $d_i$. Because $r_i$ is different for each transaction and for every digit of the PIN, the PIN digit is not revealed to an adverse observer who can ascertain which key has been pressed by the caller.

The system uses modular arithmetic to assure that the correct input is always a non-negative single digit. This enhances the system's resistance to adverse observers. Consider what happens if the random digit is 9, the PIN digit is 9 and regular addition is being used. If an adversary sees the user keying in "18," then by knowing that the largest random digit used is 9, he can deduce that the PIN digit is 9. This weakness is overcome by having the system request that the result of the operation modulo 10 be input. Performing the addition modulo 10 in the above example hides the information since the user would key in "8", which could represent the result from addition modulo 10 of any of the possible PIN digits and random numbers. For example, 9(PIN)+9(random), 1+7, 3+5 and 8+0 all result in "8".

Without the use of modular arithmetic, the limitation to a single digit input could itself reveal information to an adversary who poses as the user and makes deductions based upon the system's instructions. For example, an adversary told to add 8 to a PIN digit can deduce that the PIN digit is no more than 1, since the system would not request an operation that resulted in a number greater than 9. This problem is also solved by having the user input the result of the operation modulo 10.

Returning to FIG. 3, the system checks, in block 207, whether the digit $d_i$ input by the caller is equal to the sum modulo 10 of random number $r_i$ and the first PIN digit $p_1$. If not, the validity indicator OK is toggled to indicate an invalid input. In either case, the PIN digit counter i is indexed, and the sequence is repeated for each PIN digit.

After digits $d_i$ have been input by the caller for each digit $p_1$ of the PIN, the system checks the validity indicator OK in block 210 to determine whether any invalid digits $d_i$ were input. If the indicator shows that the caller has input an invalid digit, verification fails in block 211 and the system will refuse access to the credit card account. If the indicator shows that all digits were correctly entered, verification succeeds in block 212 and access to the account is granted.

A caller using the system would interact with the automated operator by listening to instructions and inputting responses using the telephone keypad. In the following example of such an interaction, the caller's credit card account has PIN=1645 and the system has generated the random numbers=3, 2, 2 and 8.

In this example, the operator would indicate: "Add 3 to the first PIN digit. If the result is greater than 9, subtract 10 and press the result." The system would accept an input of 4.

The operator would then indicate: "Add 2 to the second PIN digit. If the result is greater than 9, subtract 10 and press the result." The system would accept an input of 8.

Next, the operator would indicate; "Add 2 to the third PIN digit. If the result is greater than 9, subtract 10 and press the result." The system would accept an input of 6.

Finally, the operator would indicate: "Add 8 to the fourth PIN digit. If the result is greater than 9, subtract 10 and press the result." The system would accept an input of 3.

The system in this example would check each input against the sum modulo 10 of the corresponding PIN digit and random number, and grant access only upon a keypad input of "4, 8, 6, 3." No information about the PIN would be revealed to an adverse observer or to an adversary posing as a caller.

FIG. 4 illustrates an alternative system for securely verifying PIN digits. The sequence is initiated in block 301 after the automated operator has retrieved from the database the PIN digits $p_1, p_2, \ldots, p_n$ assigned to the caller's account number, and the secure PIN verification sequence is initialized and directed in blocks 302 through 311 in a manner similar to the sequence of FIG. 3.

After the system generates a random integer $r_i$, as shown in block 304, the system in block 305 subtracts modulo 10 the PIN digit $p_n$ from the random integer $r_i$ to find addend $a_i$. Finding the addend modulo 10 assures that the caller need perform only addition, and not subtraction.

In block 308, the automated operator next prompts the caller to add $a_i$ to the PIN digit $p_1$ and to enter the result modulo 10. The caller follows the instruction in block 309 by entering digit $d_i$. As in the previously described system, no information is revealed to an adverse observer who can only ascertain which key has been pressed by the caller, or to an adversary posing as a caller.

In block 310, the system checks whether the digit $d_i$ input by the caller is equal to the random digit $r_i$. The system checks the validity indicator OK and grants or denies system access in blocks 312 through 315 in a manner similar to that shown in the system of FIG. 3.

A caller using the system of FIG. 4 would interact with the automated operator as in the following example, where the PIN=1645 and the system has generated the random numbers 3, 2, 2 and 8.

In this example, the operator would indicate; "Add 2 to the first PIN digit. If the result is greater than 9, subtract 10 and press the result." The system would accept an input of 3.

The operator would then indicate: "Add 6 to the second PIN digit. If the result is greater than 9, subtract 10 and press the result." The system would accept an input of 2.

Next, the operator would indicate: "Add 8 to the third PIN digit. If the result is greater than 9, subtract 10 and press the result." The system would accept an input of 2.

Finally, the operator would indicate: "Add 3 to the fourth PIN digit. If the result is greater than 9, subtract 10 and press the result." The system would accept an input of 8.

The system in this example would check each input against the corresponding random number, and grant access only upon a keyed input of "3, 2, 2, 8." An adverse observer would gain insufficient information to gain access.

In the examples shown in FIGS. 3 and 4, the secure PIN entry system has the correct PIN in memory during the entry sequence, and the purpose of the PIN entry is to verify user knowledge of the PIN. Another application of the secure PIN entry system is for the secure entry of information previously unknown to the system. For example, the caller placing a telephone credit card call may prefer to input his credit card number, which may be his home phone number, in a manner secure from theft by adverse observers. Because the telephone system cannot identify the caller until it receives the card number, the system has no expectation for each digit of the card number as it is input by the caller.

Figure 5:
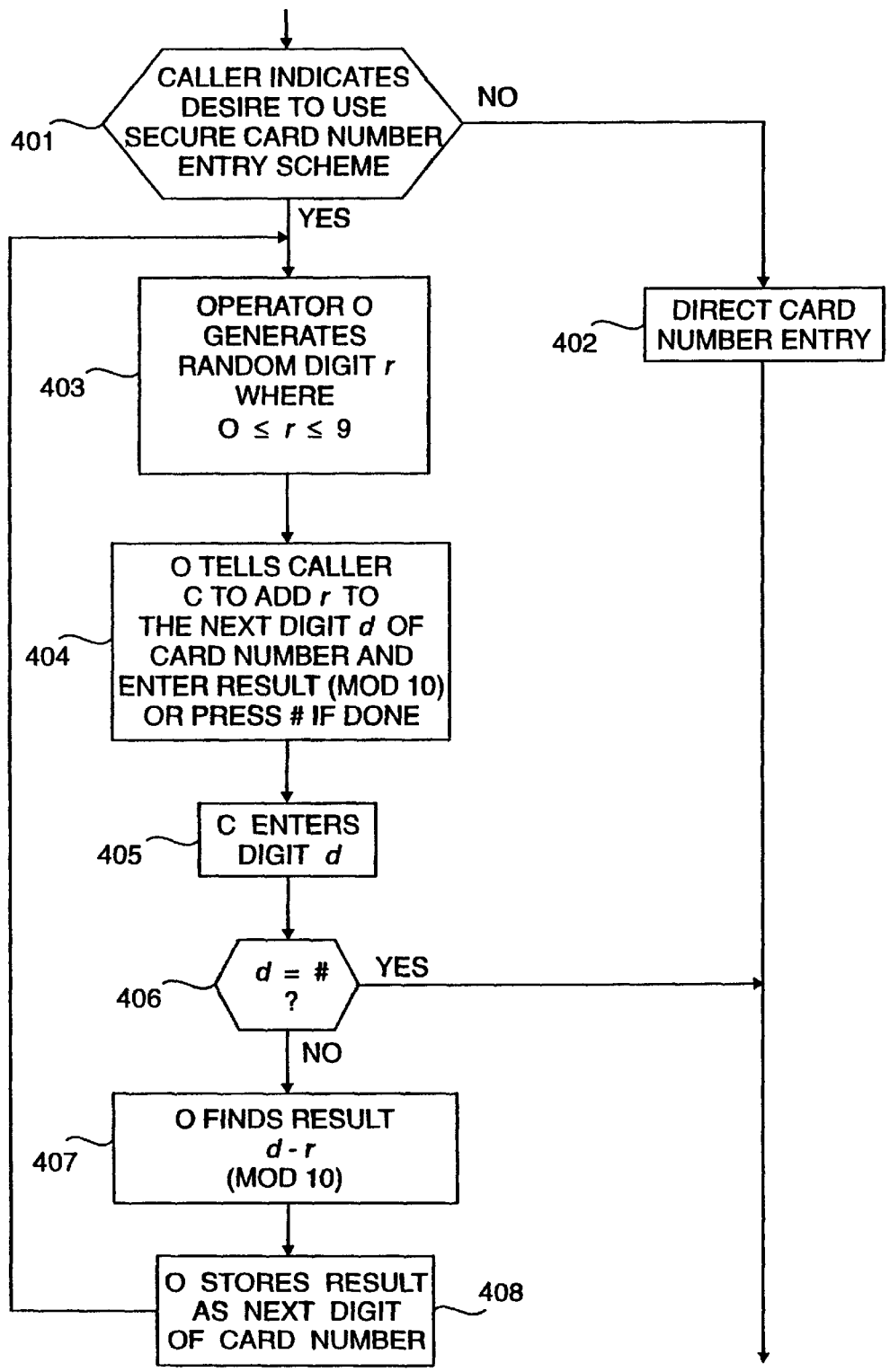
FIG. 5 is a block diagram of a secure credit card number entry arrangement suitable for use in the system of FIG. 2.

Continuing the example of a caller placing a credit card call on the public telephone, FIG. 5 shows a subsystem for the secure entry of a credit card number where the system has no knowledge of the number beforehand. This sequence replaces the portion of the system of FIG. 2 indicated by bracket "B".

The caller is given the option in block 401 of FIG. 5 of using a secure card number entry system. If the caller chooses not to use the secure system, he can enter the card number directly as shown in block 402.

If the caller chooses to use the secure entry system, the operator generates a random, single-digit number r as shown in block 403. In this example, it is assumed that the system does not have prior knowledge of the length of the string of digits to be input, so no counter is initiated as in the previous examples. The operator initially prompts the caller in block 404 to add the random digit r to the next digit of the card number, and to input the result modulo 10. The operator also tells the caller to press "#" if the last digit has been input. In this way, the system need not know beforehand the length of the input string.

After the caller enters a digit in block 405, the sequence checks in block 406 for a "#" digit indicating that input of the card number is complete. If the input is complete, the system proceeds with the next portion of the transaction. Otherwise, the operator in block 407 subtracts the random number r from d, and adds 10 if the result is negative. In this way, the system recreates the digit of the caller's card number.

The system then stores the digit as shown in block 408, and repeats the input process until the caller terminates it by entering "#" at the prompt. An adverse observer would gain no information about the card number by ascertaining which keys were pressed by the caller.

While the system shown in FIG. 5 can receive an unknown card number of unknown length, a simpler system is employed if the number of digits in the card number is known before hand. For example, in the simpler system, references to "#" in block 404, and decision block 406, are eliminated.

In another embodiment of the invention, or as an enhancement to the random addition and subtraction operations performed on the input digits in the above examples, the order in which the digits are processed is varied from transaction to transaction. The user could, for example, be prompted to process the third PIN digit first in a given transaction. An adverse observer attempting to enter the digits in the observed order in a subsequent transaction would therefore be unsuccessful.

A further enhancement is the interspersing of random numbers among the input digits. At random points during the prompting for inputs of the digits, the system prompts the user to input "dummy" random numbers. An adverse observer would not know which of the keys pressed by the user represented an actual PIN digit input and which did not.

Each of the embodiments mentioned can be used alone or in combination to provide systems revealing varying amounts of information to an adversary and placing varying degrees of inconvenience on the caller. For example, requiring the caller to scramble the order of the digit alone is very simple, but reveals the identity of the PIN digits, although not their order, to an observer. Interspersing random digits among the scrambled PIN digits is slightly less convenient to the caller, but discloses less information to the observer. Requiring the caller to perform pure addition or subtraction operations on the digits still reveals some information, as noted above. Using modular arithmetic is slightly more burdensome, but is the least complex operation revealing absolutely no information to an observer. More complex mathematical operations offer no increase in security, and may even erode security where scratch paper is used, because it may act as evidence to an observer.

Maximum security from PIN thefts by observation is provided by a system combining the prompted random addition operations on each PIN digit with varying the order of the PIN digit input, and interspersing "dummy" random numbers.

While the detailed examples given above relate to the placing of a credit card call on a public telephone, other uses of the system are contemplated where the secure entry of a PIN is required, such as conducting banking transactions at an ATM. In this embodiment, the prompts given to the user would, for example, be communicated through an alphanumeric display such as a CRT, which is hidden from the view of potential adverse observers.

It should be understood that the above-described arrangements of the invention are merely illustrative. Other arrangements may be devised by those skilled in the art which will embody the principles of the invention and fall within the spirit and scope thereof.

I claim:

1. A method for authenticating a multi-digit personal identification number (PIN) having a plurality of digits using a digit-by-digit dialogue via electromagnetic communication, comprising the steps of:

(A) generating a random number;

(B) providing a user with a first value that is a function of the random number, wherein the first value is provided to the user via an electronic device;

(C) prompting the user to encode a selected PIN digit, wherein the user calculates a second value that is the result of a mathematical operation involving, as operands, the selected PIN digit and the first value;

(D) receiving the second value from the user via electromagnetic communication;

(E) authenticating the selected PIN digit using the second value and a third value that is a function of the first value; and (F) repeating steps (A) thru (E) for each of the plurality of digits of the multi-digit PIN.

2. The method of claim 1, and further comprising the steps of:

identifying the user by requesting and receiving non-confidential information; and retrieving from memory the multi-digit PIN of the user; wherein, in step (B), the function is a first operation wherein the operands are the selected PIN digit and the random number, and further wherein, in step (C), the second value is the random number, and further wherein, in step (E), the third value is the random number.

3. The method of claim 2, wherein the function of step (B) is subtracting modulo 10 the selected PIN from the random number.

4. The method of claim 3, wherein the mathematical operation of step (C) is summing modulo 10 the first value and the selected PIN.

5. An apparatus for authenticating a personal identification number (PIN) having a plurality of digits, comprising:

a central processing unit (CPU) configured to cause a random number generator to generate a random number for each of the plural digits in the PIN and further configured to calculate a plurality of values, one for each random number, wherein each value is a function of one of the random numbers; and a prompter for prompting the user to encode one of the PIN digits at a time using one of the calculated values, and for prompting the user to provide the encoded PIN digit to an input device; and an authenticator that receives the encoded digit from the input device and authenticates the PIN digit;

wherein the CPU is further configured to cause the prompter to prompt the user to encode each PIN digit in the PIN after the previously-encoded digit is provided to the input device.

6. An apparatus for authenticating a multi-digit personal identification number (PIN), comprising:

a processor; and a computer readable medium having program code embodied therein for causing the processor to perform at least a first, second, third, fourth and fifth function, the program code comprising:

code segment for causing performance of the first function wherein the processor generates a random number;

code segment for causing performance of the second function wherein the processor generates a first value that is a function of the random number and causes the first value to be provided, via electronic means, to a user;

code segment for causing performance of the third function wherein the processor receives a second value from the user, said second value being representative of an encoded selected PIN digit, said encoding resulting from a mathematical operation involving, as operands, the selected PIN digit and the first value;

code segment for causing performance of the fourth function wherein the processor authenticates the selected PIN digit using the second value and a third value that is a function of the first value; and code segment for causing performance of the fifth function wherein the processor authenticates each PIN digit in the multi-digit PIN on a digit-by-digit basis, such that a new first value is provided to the user for encoding a new selected PIN digit after the second value representative of the previously-encoded selected PIN digit is received by the processor.

* * * * *